(12) United States Patent
Malik (10) Patent No.: US 9,381,617 B2
(45) Date of Patent: Jul. 5, 2016

(54) SINTERED CUBIC BORON NITRIDE CUTTING TOOL

(75) Inventor: Abds-Sami Malik, Westerville, OH (US)

(73) Assignee: Diamond Innovations, Inc., Worthington, OH (US)

(*) Notice: Subject to any disclaimer, the term of this patent is extended or adjusted under 35 U.S.C. 154(b) by 434 days.

(21) Appl. No.: 13/175,171

(22) Filed: Jul. 1, 2011

(65) Prior Publication Data

US 2012/0000138 A1  Jan. 5, 2012

Related U.S. Application Data

(60) Provisional application No. 61/360,607, filed on Jul. 1, 2010.

(51) Int. Cl.
| | | |
|---|---|---|
| *B24D 3/00* | (2006.01) | |
| *B24D 3/34* | (2006.01) | |
| *C04B 35/58* | (2006.01) | |

(Continued)

(52) U.S. Cl.
CPC ............ *B24D 3/34* (2013.01); *C04B 35/58014* (2013.01); *C04B 35/5831* (2013.01); *C04B 35/62615* (2013.01); *C22C 26/00* (2013.01); *C04B 2235/3804* (2013.01); *C04B 2235/3843* (2013.01); *C04B 2235/3856* (2013.01); *C04B 2235/3886* (2013.01); *C04B 2235/402* (2013.01); *C04B 2235/5436* (2013.01); *C04B 2235/5445* (2013.01); *C04B 2235/5472* (2013.01); *C04B 2235/786* (2013.01); *C04B 2235/80* (2013.01)

(58) Field of Classification Search
CPC ............ B24D 3/00; B24D 18/00; B22F 7/00; C04B 35/58; C04B 35/00; C09K 3/1463; C09K 3/1409

USPC .................................................. 175/327–435
See application file for complete search history.

(56) References Cited

U.S. PATENT DOCUMENTS

| | | | | |
|---|---|---|---|---|
| 4,334,928 A | * | 6/1982 | Hara et al. | ........................ 75/238 |
| 4,788,167 A | * | 11/1988 | Mathers et al. | .............. 501/96.1 |

(Continued)

FOREIGN PATENT DOCUMENTS

| | | | | |
|---|---|---|---|---|
| EP | 816304 A2 | * | 1/1998 | .......... C04B 35/5831 |
| EP | 1870185 A1 | | 12/2007 | |

(Continued)

OTHER PUBLICATIONS

M.P. Bezhenar, et.al."Structure of composites of the cBN-Al-Zrn system produced by high-pressure sintering", Journal of Superhard Materials, vol. 31, No. 6. Dec. 31, 2009, pp. 357-362.

*Primary Examiner* — Kaj K Olsen
*Assistant Examiner* — Alexandra M Moore (57) ABSTRACT

A cutting tool having a sintered compact including 30 to 80 vol. % cubic boron nitride and a binder phase, wherein the binder phase includes about 2 to about 6 vol. % ZrN, is disclosed. In more specific examples, the cutting tool has a sintered compact including 30 to 80 vol. % cubic boron nitride, between about 4 vol. % and about 15 vol. % aluminum and/or aluminum compound and/or aluminum alloy and/or combinations thereof, and a binder phase, wherein the binder phase includes TiN and about 3 to about 5 vol. % ZrN, and wherein the cubic boron nitride has a grain size of less than 20 microns. Cutting tools of the disclosed composition display improved performance, particularly at higher operating speeds, e.g., about 200 m/min or greater.

13 Claims, 8 Drawing Sheets

(51) Int. Cl.
  *C04B 35/5831* (2006.01)
  *C04B 35/626* (2006.01)
  *C22C 26/00* (2006.01)

(56) References Cited

U.S. PATENT DOCUMENTS

| | | | |
|---|---|---|---|
| 6,013,117 A | 1/2000 | Ederyd | |
| 2008/0302023 A1* | 12/2008 | Goudemond et al. | 51/309 |

FOREIGN PATENT DOCUMENTS

| | | |
|---|---|---|
| EP | 2039667 A1 | 3/2009 |
| JP | 1122970 A | 5/1989 |
| JP | 1122971 A | 5/1989 |
| JP | 9143606 A | 6/1997 |
| JP | 9143607 A | 6/1997 |
| JP | 2007084382 A | 4/2007 |
| WO | 2006046753 A1 | 5/2006 |

* cited by examiner

SINTERED CUBIC BORON NITRIDE CUTTING TOOL

TECHNICAL FIELD AND INDUSTRIAL APPLICABILITY

The present disclosure relates to cubic boron nitride cutting tools, for example, cutting tools for hard part turning. More specifically, cubic boron nitride cutting tools including about 30 to about 80 vol. % cubic boron nitride relative to the whole sintered compact and a binder phase that includes about 2 to about 10 vol. % ZrN exhibit advantageous effects on wear resistance and toughness of the cutting tool. The disclosure also relates to a production method of such a cubic boron nitride cutting tool.

BACKGROUND OF THE INVENTION

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Currently available tool materials use nitrides or carbides of Ti, mixed with cubic boron nitride (cBN), to form a sintered compact. At speeds greater than 200 m/min, in continuous cutting of materials such as hard steel (greater than about 45-50 HRC), frictional heat can cause rapid wear of current tool materials. Adding heat resistant ceramic, such as TiN, can improve performance in continuous cutting, but at the expense of reduced fracture toughness. Reduced fracture toughness can become a problem in interrupted cutting because the tool fails by chipping. Thus, there is a need to provide a tool material that can machine hard steel parts (>45 HRC) at greater speeds and for longer than is currently possible.

SUMMARY OF THE INVENTION

The disclosed materials and methods provide a cubic boron nitride cutting tool that can be operated at higher speeds and last longer than currently available materials by incorporating a ceramic that can improve performance in continuous cutting without sacrificing performance in interrupted cutting. It has been found that replacing small amounts of the ceramic in a cubic boron nitride cutting tool with ZrN leads to a material with improved performance. A secondary beneficial effect is observed for limiting aluminum and/or aluminum-alloy and/or aluminum compound and/or combinations thereof present in the cutting tool. A tertiary beneficial effect is observed for powder blending methods that increase homogeneity, such as attritor milling and spray drying, provided that the compositional parameters have been optimized.

An exemplary cutting tool comprises a sintered compact including about 30 about to 80 vol. % cubic boron nitride and a binder phase, wherein the binder phase includes about 2 to about 6 vol. % ZrN.

An exemplary cutting tool comprises a sintered compact including about 30 to about 80 vol. % cubic boron nitride, between about 4 vol. % and about 10 vol. % aluminum, and/or aluminum compound and/or aluminum alloy and/or combinations thereof and a binder phase, wherein the binder phase includes about 2 to about 6 vol. % ZrN, wherein the binder phase includes TiN, TiC, TiCN or mixtures thereof, and wherein the cubic boron nitride has a grain size of less than about 20 microns.

It is to be understood that both the foregoing general description and the following detailed description are exemplary and explanatory and are intended to provide further explanation of the invention as claimed.

BRIEF DESCRIPTION OF THE DRAWINGS

The following detailed description can be read in connection with the accompanying drawings in which like numerals designate like elements.

DETAILED DESCRIPTION OF EXEMPLARY EMBODIMENTS

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means plus or minus 10% of the numerical value of the number with which it is being used. Therefore, about 50% means in the range of 45%-55%.

Cutting tools that are favored for hard part turning (generally work pieces greater than about 45-50 HRc), are polycrystalline composites of cubic boron nitride (cBN) and TiN, TiC, or TiCN. The amount of cBN in these composites generally ranges from about 35 to about 65 volume % with the balance being ceramic. It has been found that replacing small amounts of the ceramic in sintered cubic boron nitride (cBN) cutting tools with ZrN leads to a material with improved performance. This improvement has been found with about 2 vol. % to about 10 vol. %, alternatively about 3 vol. % to about 5 vol.

%, alternatively about 3 vol. % of ZrN added to the ceramic composition. Herein, volume percent (vol. %) is relative to the whole sintered compact.

Adding ZrN above the about 10 vol. % level does not provide improving benefits because the tool becomes too soft and then fails prematurely by wearing. Alternatively, HfN may also be added in the same vol. % ranges as disclosed for ZrN.

Without being bound to theory, it is hypothesized that the ZrN acts as a 'lubricant' to reduce the frictional heat and thus the tool lasts longer. Also and without being bound to theory, it is hypothesized that ZrN, which is more metallic in chemical behavior than TiN, serves as a toughening agent to arrest crack propagation in the ceramic phase. A tool formed of this composition can be operated at higher speeds and last longer than currently available materials by incorporating a ceramic that can improve performance in continuous cutting without sacrificing performance in interrupted cutting. The enhanced performance did not become apparent unless the tool was tested at a speed of about 200 m/min. At lower speeds about 100 m/min, there was no enhancement in performance.

In the following descriptions of experiments, specified sources and equipment are exemplary, illustrative of a working embodiment, and not intended to limit or otherwise be bound to the illustrative parameters. Other suitable sources and equipment can be utilized within the scope of the invention as defined in the appended claims.

Experimental Procedures—Blends:

ZrN was first planetary milled using a Retsch PM400 model. ZrN (available from Japan New Metals), WC milling media (¼" balls) and isopropanol were placed in a steel milling jar (500 mL capacity, stainless steel "comfort" Retsch grinding jar) and milled at 300 rpm for 45 minutes, reversing direction every 5 minutes. The resulting slurry was air dried overnight and sieved on a 40 mesh screen. The powders obtained had a particle size distribution (PSD) with d90 of approximately 1.5 microns and were used subsequently to make blends.

The planetary mill was also used to make blends of cBN, TiN, ZrN and Al. The TiN was substoichiometric with an approximate formula of $TiN_{0.72}$. The resulting slurries were oven dried overnight and then passed through a 40 mesh screen.

Blends were also made in a conventional ball mill using cBN, TiN, ZrN and Al. The TiN was substoichiometric with an approximate formula of $TiN_{0.72}$. The blends were ball milled with WC milling media and isopropanol at, for example, 60 rpm for 2 hours. The resulting slurry was dried in an oven, in air, for several hours then passed through a 40 mesh screen.

An attritor mill (Union Process, model HD01) was also used to make blends in a 250 mL capacity jar with WC milling media and isopropanol at 200 rpm for 10 minutes. The resulting slurry was dried in an oven, in air, for several hours then passed through a 40 mesh screen.

The compositions described above are listed in Table 1 and Table 2, with the amounts given in grams and volume percent, respectively.

TABLE 1

Compositions of Samples (in grams)

| Sample | Al | cBN (2-3 μm) | cBN (1-2 μm) | ZrN | TiN | Milling Process |
| --- | --- | --- | --- | --- | --- | --- |
| 50-1 | 9 | 68.9 | — | 50 | 52.1 | Ball mill |
| 50-2 | 9 | 68.9 | — | 0 | 102.1 | Ball mill |
| 50-3 | 5.2 | 70.4 | — | 50 | 54.4 | Ball mill |
| 50-4 | 5.2 | 70.4 | — | 0 | 104.4 | Ball mill |

TABLE 1-continued

Compositions of Samples (in grams)

| Sample | Al | cBN (2-3 μm) | cBN (1-2 μm) | ZrN | TiN | Milling Process |
| --- | --- | --- | --- | --- | --- | --- |
| 50-5 | 7.1 | 69.7 | — | 25 | 78.2 | Ball mill |
| 50-6 | 6.15 | 70.1 | — | 12.5 | 91.25 | Ball mill |
| 75-1 | 2.25 | 17.25 | — | — | 25.5 | Planetary |
| 75-2 | 2.25 | 17.25 | — | — | 25.5 | Planetary |
| 84-1 | 2.25 | 13.7 | 3.7 | 2.50 | 22.8 | Planetary |
| 84-2 | 2.25 | 13.7 | 3.7 | 3.75 | 21.6 | Planetary |
| 85-1 | 7 | 69.7 | — | 10 | 93.3 | Ball mill |
| 85-2 | 7 | 69.7 | — | 15 | 88.3 | Ball mill |
| 85-3 | 9 | 54.7 | 15 | 10 | 91.3 | Ball mill |
| 85-4 | 9 | 54.7 | 15 | 15 | 86.3 | Ball mill |
| 91-1 | 2.3 | 14.4 | 3.6 | 2.5 | 22.3 | Planetary |
| 91-2 | 2.3 | 15.8 | 4.0 | 2.5 | 20.5 | Planetary |
| 91-3 | 2.3 | 15.0 | 3.0 | 2.5 | 22.3 | Planetary |
| 91-4 | 2.3 | 13.8 | 4.15 | 2.5 | 22.3 | Planetary |
| 107-1 | 2.25 | 13.7 | 3.7 | 2.5 | 22.8 | Planetary |
| 107-2 | 2.25 | 15.6 | 4.2 | 2.25 | 20.5 | Planetary |
| 107-3 | 2.25 | 17.8 | 4.8 | 2.0 | 18.2 | Planetary |
| 107-4 | 2.25 | 19.8 | 5.3 | 1.75 | 16.0 | Planetary |

TABLE 2

Compositions of Samples (in vol. %)

| Sample | Al | cBN | ZrN | TiN | Milling Process |
| --- | --- | --- | --- | --- | --- |
| 50-1 | 8.3 | 49.3 | 17.6 | 24.8 | Ball mill |
| 50-2 | 7.8 | 46.4 | 0 | 45.8 | Ball mill |
| 50-3 | 4.9 | 51.0 | 17.8 | 26.3 | Ball mill |
| 50-4 | 4.6 | 48.0 | 0 | 47.4 | Ball mill |
| 50-5 | 6.4 | 48.7 | 8.6 | 36.4 | Ball mill |
| 50-6 | 5.5 | 48.3 | 4.2 | 42.0 | Ball mill |
| 75-1 | 7.8 | 46.4 | — | 45.8 | Planetary |
| 75-2 | 7.8 | 46.4 | — | 45.8 | Planetary |
| 84-1 | 7.9 | 47.4 | 3.3 | 41.4 | Planetary |
| 84-2 | 7.9 | 47.6 | 5.0 | 39.4 | Planetary |
| 85-1 | 6.2 | 47.8 | 3.4 | 42.7 | Ball mill |
| 85-2 | 6.2 | 48.1 | 5.1 | 40.6 | Ball mill |
| 85-3 | 7.9 | 47.4 | 3.3 | 41.4 | Ball mill |
| 85-4 | 7.9 | 47.7 | 5.0 | 39.4 | Ball mill |
| 91-1 | 8.0 | 48.6 | 3.3 | 40.1 | Planetary |
| 91-2 | 7.9 | 52.6 | 3.3 | 36.3 | Planetary |
| 91-3 | 8.0 | 48.6 | 3.3 | 40.1 | Planetary |
| 91-4 | 8.0 | 48.5 | 3.3 | 40.2 | Planetary |
| 107-1 | 7.9 | 47.4 | 3.3 | 41.4 | Planetary |
| 107-2 | 7.7 | 52.8 | 2.9 | 36.5 | Planetary |
| 107-3 | 7.5 | 58.5 | 2.5 | 31.4 | Planetary |
| 107-4 | 7.3 | 63.5 | 2.2 | 27.0 | Planetary |

In samples where cBN (2-3 μm) and cBN (1-2 μm) were both used in the composition (see Table 1), the amount of cBN given in Table 2 is the total of cBN (2-3 μm) and cBN (1-2 μm).

As seen from Table 1, the grain size of the cubic boron nitride can have a bimodal distribution. For example, about 75% of the cubic boron nitride can have a grain size in a first range of about 2 microns to about 3 microns and the remainder of the cubic boron nitride can have a grain size in a second range of about 1 micron to about 2 microns.

Experimental Procedures—Sintered Bodies:

Sintered blanks were produced by loading the powder blend into refractory metal (e.g. Ta) cups capped by a WC substrate. This was then loaded into a high pressure cell and pressed on a belt-type High Pressure—High Temperature (HPHT) apparatus at about 45 kBar and about 1400° C. for about 30 minutes.

Sintered blanks were finished by grinding to 3.2 mm overall thickness and then tool tips were cut out by wire electrical discharge machining (EDM) and brazed to a WC substrate for tool fabrication. CNGA-432 inserts having edge geometry of 0.004" (0.1 mm)×30° chamfer+0.001" (25 microns) hone were fashioned for tool testing.

Example testing procedures relative to the disclosed cutting tools, compositions, and methods are detailed starting in the following paragraphs.

Experimental Procedures—Machining Tests:

Machining tests were done on 8620 case-hardened steel or 52100 through-hardened steel in continuous or interrupted cut, respectively, as described below.

Wear resistance was evaluated with a facing test on 8620 case-hardened steel, with a hardness of Rc 61-63. 8620 discs are 10" (250 mm) outer diameter, 1" (25 mm) inner diameter and 2.25" (56.3 mm) wide. The hardness of 8620 discs varies from Rc 63 at the surface to Rc 55 at 0.030" (0.75 mm) from the surface. Tests were conducted in the hardness range of Rc 55-63.

Constant surface speed of 656 sfm (200 m/min.), 0.008 ipr (0.2 mm/rev) feed rate and 0.006" (0.15 mm) depth of cut was maintained. The length of cut was 4.5" (114.3 mm) and the time for each cut was 1.23 minutes.

Flank wear on inserts and surface roughness on the work piece Ra and Rz were measured, e.g., following the procedures in Leigh Mummery, "Surface Texture Analysis," in The Handbook Hommelwerke, GmbH, (1990), after every pass and recorded. Wear on flank and crater on the rake face were photographed and documented after each pass and tests were terminated once the flank wear reached 0.008" (0.2 mm) or chipping of the edge occurred. Tool life was defined as the time required to attain the set wear limit or chipping of the cutting edge. Three edges of each grade were tested.

A secondary wear resistance test was done with a facing test on 52100 through hardened steel with hardness of Rc 60. 52100 discs were 6" (150 mm) outer diameter, 1" (25 mm) inner diameter and 0.75" (19.1 mm) wide.

Tests were conducted at constant surface speeds of 356 sfm (109 m/min), 508 sfm (155 m/min.) or 656 sfm (200 m/min), with 0.003 ipr (0.075 mm/rev) feed rate and 0.010" (0.25 mm) depth of cut using the same style of insert and edge geometry described above. The length and time of cut was 2.5" (63.5 mm).

Flank wear on inserts and surface roughness on the work piece (Ra and Rz) were measured after every pass and recorded. Wear on flank and crater on the rake face were photographed and documented after each pass. Tests were terminated once the flank wear reached 0.008" (0.2 mm) or edge chipping occurred.

Tool life was defined as the time required to generate the set wear limit or chipping of the cutting edge. Three edges of each grade were tested.

Interrupted facing tests to determine impact resistance (toughness) were conducted on 52100 steel, hardness of Rc 60. 52100 ring dimensions were 8" (200 mm) outer diameter, 7" (175 mm) inner diameter and 2.25" (90 mm) wide. The ring had a 0.400" (10 mm) wide×0.840" (21 mm) deep slot to provide interruption in the cut.

Interrupted facing tests were conducted at a constant surface speed of 394 sfm (120 m/min.) using the same style of insert and edge geometry described above but depth of cut and feed rate were incrementally increased. The starting feed rate and depth of cut were the same, 0.0104" (0.26 mm) and the length of cut was 0.5" (12.5 mm). After testing at the starting feed and depth of cut, the insert was observed under a microscope to determine whether the tool had chipped. The criterion of failure was a chipped tool. If the tool had failed, then that feed rate was determined to be the failure feed rate. If the tool passed, the feed and depth of cut were increased by 0.0008" (0.02 mm) and another tested was done on the same edge. This process was repeated until the tool failed (chipped). Four different wear edges were tested to assess the average toughness.

Figure 1:
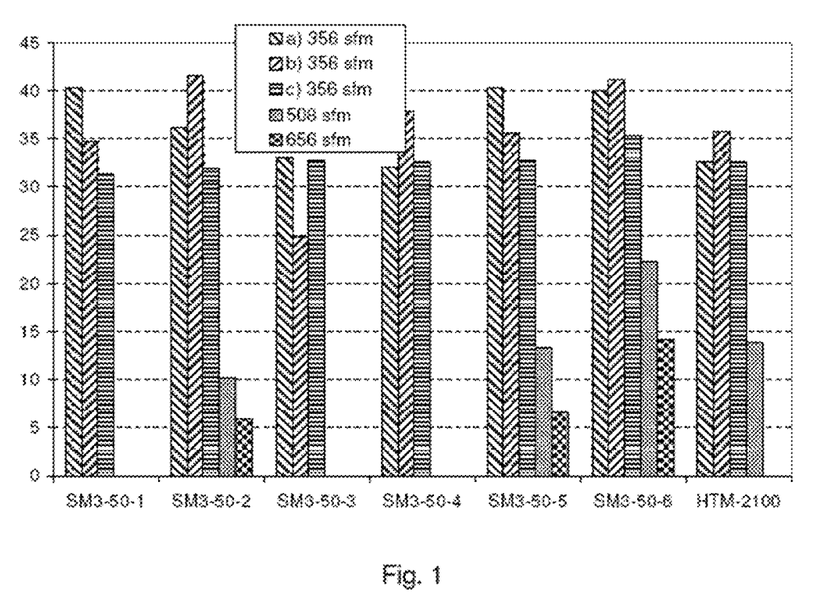
FIG. 1 gives results for tool life in the 52100 wear test at 109, 155, and 200 m/min (356, 508, and 656 sfm).

Effect of ZrN:

FIG. 1 gives results for tool life in the 52100 wear test at 109, 155, and 200 m/min (356, 508, and 656 sfm). Also given for comparison are results for standard HTM2100 (Diamond Innovations, Inc.). It is clear from the data that, at the lowest speed, there is no discernible difference between any of the compositions and, indeed, they are all quite similar to standard HTM2100. However, at the two higher speeds, sample 50-6 exhibits greater tool life. Samples without data at higher speeds could not be tested because of excessive wear or failure when run at the higher speeds. It is interesting to note that ZrN seems most effective when present in small quantities.

Figure 2:
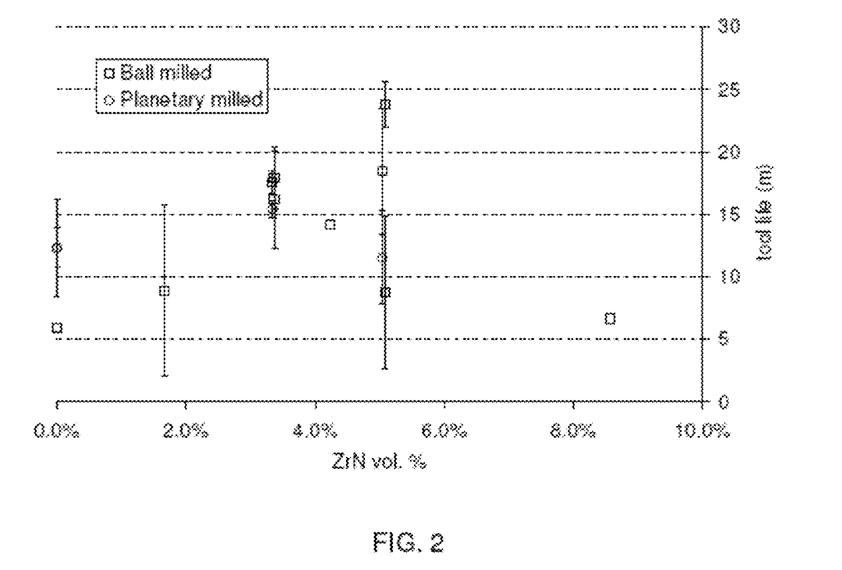
FIG. 2 is a plot of tool life vs. ZrN content in a continuous turning test in 8620 steel.

FIG. 2 plots results for tool life in the 8620 wear test against volume % ZrN. The data are the results of several trials and the error bars are also given. The results plotted in FIG. 2 support the observation that small additions of ZrN, i.e., less than about 6 vol. % ZrN, improve performance while larger additions, e.g., greater than or equal to about 10 vol. %, alternatively greater than or equal to about 9 vol. %, can result in tool life decrease. Consistently high performance is obtained at about 3.3 to about 3.4 vol. % ZrN. The standard deviation around this set of data is relatively small. Going to higher ZrN content, at around about 5.0 or about 5.1 volume %, some further increase in performance can be obtained. Thus, tool life increase as a result of ZrN addition reaches a local maximum between about 2 vol. % and about 10 vol. %. Thus, ZrN content for improved performance is between about 2 vol. % and about 6 vol. %, alternatively between about 2 vol. % and about 5 vol. %, alternatively between about 3 vol. % and about 5 vol. %, alternatively about 5 vol. % (±10%).

Effect of Milling Process:

Looking at the data for 0 vol. % ZrN addition, one can compare results for planetary milling (symbol=○) to results for ball milling (symbol=□). The planetary milled sample shows a marked improvement in performance in tool life relative to the ball milled sample over a ZrN content range of about 3 to about 6 vol. %.

Figure 3A:
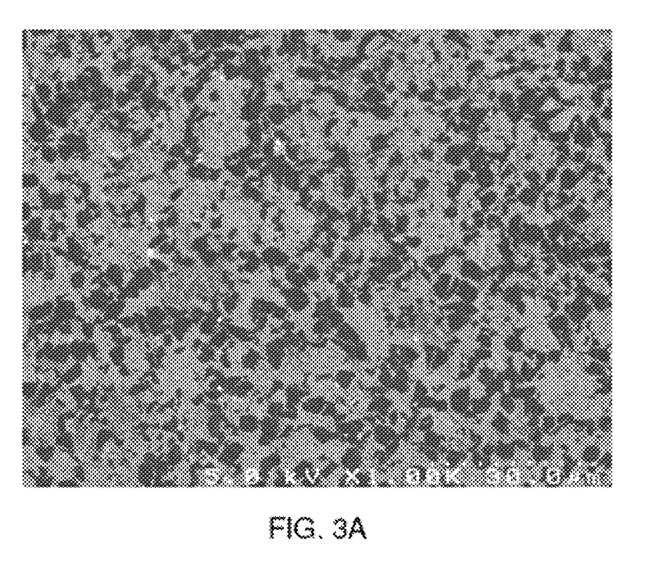
FIGS. 3A and 3B are SEM micrographs at 1000× magnification of a ball milled sample (FIG. 3A) and a planetary milled sample (FIG. 3B) showing the difference in cBN grain distribution and microstructure homogeneity resulting from these two powder blending methods that increase homogeneity.
Figure 3B:
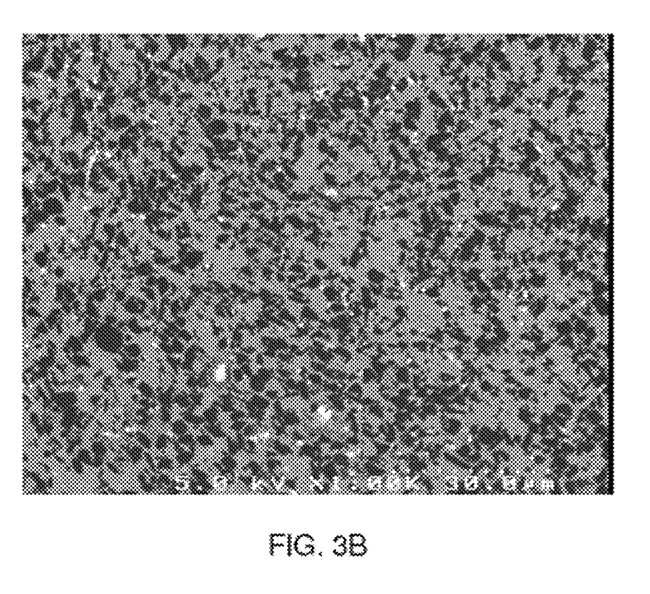

This is a startling result and highlights the importance of blend processing. The planetary mill is a much higher energy process. As a consequence, the resulting blend is more homogeneous. This can be seen by comparing the SEM images in FIGS. 3A and 3B. FIG. 3A is a SEM micrograph of a ball milled sample (sample 50-2) and FIG. 3B is a SEM micrograph of a planetary milled sample (sample 75-2). Both samples did not contain any ZrN. More clumps of cBN are apparent in the standard ball milled sample and the planetary milled sample appears to have a more homogeneous distribution of cBN particles (dark areas) relative to the ball milled sample.

The planetary milling process considerably reduced the particle size of the ZrN, but introduced mill debris amounting to, for example, about 5.9 wt. % Fe and about 0.5 wt. % W. Accordingly, while planetary milling provides an adequate result, milling techniques that introduce less impurities, such as jet milling, would be an alternative process for scale up to production as it would be expected to introduce a reduced amount of impurities.

The planetary milling process reduced the particle size of the ZrN, but introduced more WC mill debris (white regions), which is a consequence of the higher milling energy. This mill debris can be inimical to sintering if present in too great a quantity. For example, Samples 75-1 and 75-2 were nominally the same composition, but the former was milled for a longer time than the latter. The resulting blends were sintered under the same conditions. However, the blend that was milled for a longer time (Sample 75-1) had more sintering defects, such as cracks and chips, than the sample (Sample 75-2) milled for a shorter period of time. This suggests that controlling the milling parameters and/or processes to limit the amount of mill debris while obtaining blend homogeneity is necessary.

Figure 4:
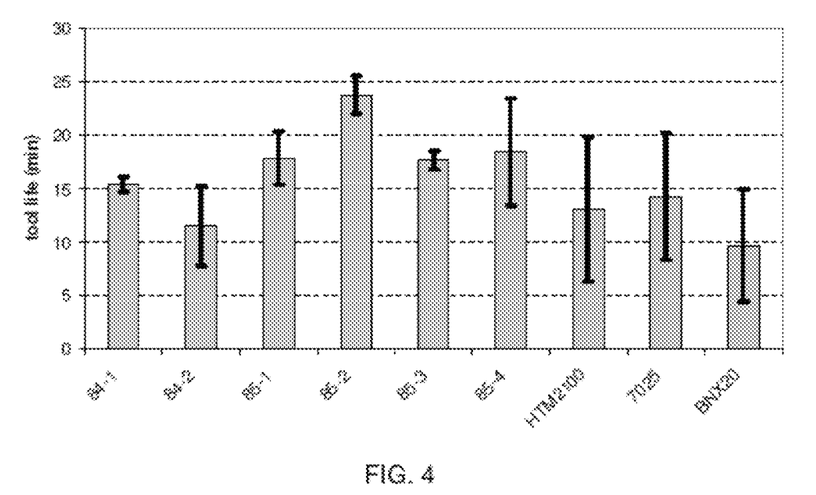
FIG. 4 is a plot of tool life in minutes for a continuous turning test in 8620 steel for the samples listed in Tables 1 and 2.

The effect of milling process on performance for compositions that contain ZrN can be compared from FIG. 4. FIG. 4 is a plot of tool life in minutes for the 8620 continuous turning test for multiple samples. Samples in the 84-X series were planetary milled whereas samples in the 85-X were ball milled. Results for standard grades HTM2100 (Diamond Innovations, Inc.), 7025 (Sandvik Coromant), and BNX20 (Sumitomo) are also given in FIG. 4 for comparison. The longest tool life is obtained for Sample 85-2, which contains 5.1 vol. % ZrN. This correlates well with the data in FIG. 2, which shows that high tool life can be obtained with about that amount of ZrN. In addition, the trend from FIG. 2 regarding the advantage of planetary milled samples relative to ball milled samples continues to hold at higher vol. % of ZrN.

To get a direct comparison of the effect of milling process when ZrN is present, one can compare Samples 84-1 and 84-2 with Samples 85-3 and 85-4. As given in Table 1 and Table 2, the only difference between these two sets of compositions is the milling method, so they can be directly compared. Unlike the observation made in FIG. 2, the planetary milled samples (Samples 84-1 and 84-2) have lower tool life than the ball milled samples (Samples 85-3 and 85-4). In particular, Sample 84-2 has much lower average tool life than Sample 85-4. However, performance of Samples 84-1 and 85-3 are not appreciably different if one takes into account the measurement error. Based on these results, it appears that planetary milling did not yield a dramatic improvement in performance of compositions containing ZrN as compared to the observations on compositions with no ZrN.

Figure 5:
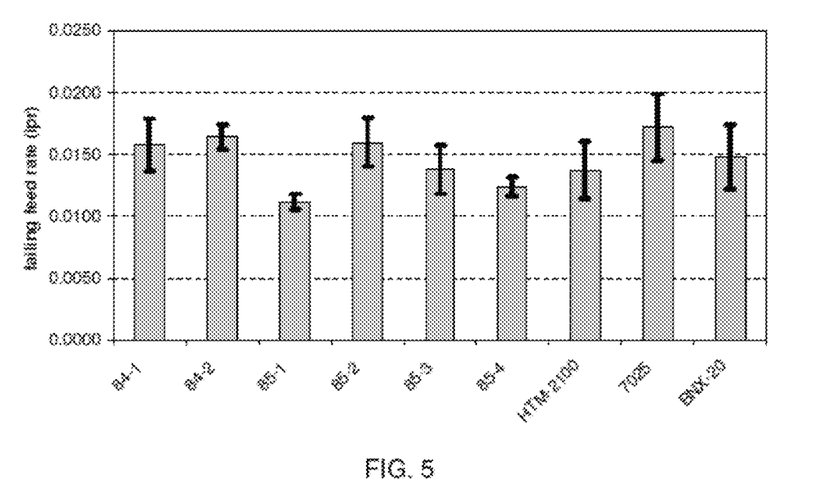
FIG. 5 shows the results for an interrupted turning test in 52100 steel for the same samples as in FIG. 4.

The planetary milled samples prove to be more robust in the toughness test. FIG. 5 shows the results for the 52100 toughness test for the same samples as in FIG. 4. For comparison, the toughness test results for standard commercial grades HTM-2100, 7025, and BNX-20 are also plotted. Sample 84-1 is slightly tougher than 85-3 but still within measurement error. But Sample 84-2 is unambiguously tougher than Sample 85-4. Considering both wear and toughness, planetary milling offers a measurable advantage over standard ball milling.

Effect of Aluminum Content:

Considering the results in FIG. 4 for Samples 84-2 and 85-4, each of which have 5.0 vol. % ZrN as shown in Table 2, one can observe another influence on tool life—aluminum content. The Al content of Sample 85-2 (6.2 vol. %) is less than that of Samples 84-2 and 85-4 (7.9 vol. %). This result indicates that increased Al content may cause formation of more brittle phases leading to lower tool life and less predictable wear.

Figure 6:
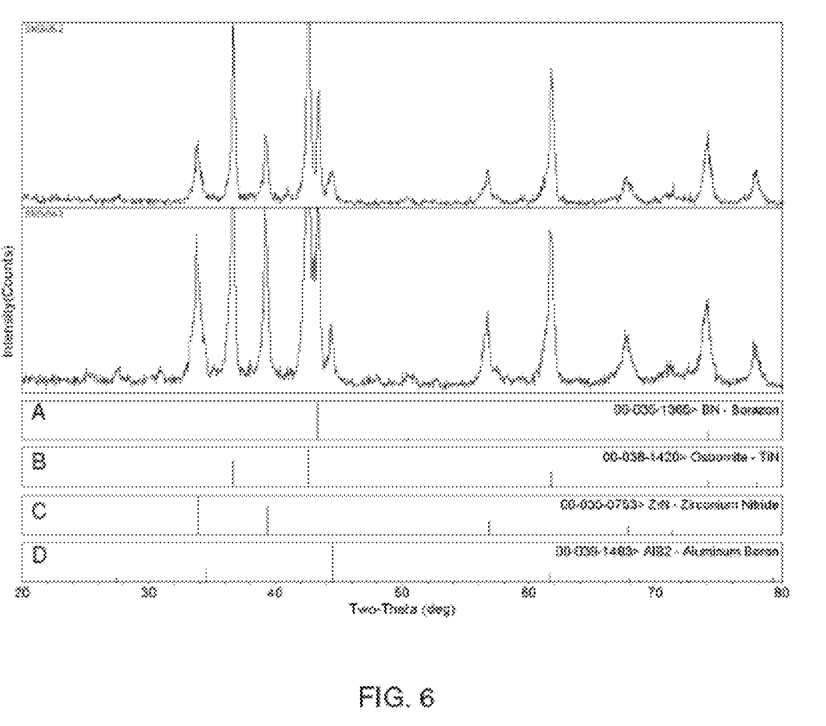
FIG. 6 is an X-ray diffraction pattern of samples 85-2 (top) and 84-2 (bottom).

FIG. 6 shows x-ray diffraction (XRD) patterns of Samples 85-2 (top) and 84-2 (bottom). The XRD patterns reveal that cBN, TiN, ZrN, and $AlB_2$ are present in both samples, as shown in the elemental analysis below the XRD patterns (annotated as A to D, respectively). However, note the greater intensity of the peaks attributed to $AlB_2$ in Sample 84-2, e.g., peaks at two theta positions of about 34 degrees, about 45 degrees, about 62 degrees and about 68 degrees. Qualitatively, this indicates that more of the $AlB_2$ phase is present in Sample 84-2 than in Sample 85-2. The first three compounds were put into the original feed blend, but the last one was created by the reaction of Al with cBN in the press. $AlB_2$ is a well known ceramic and its role in contributing to the brittleness of PCBN products has been previously observed.

Figure 7:
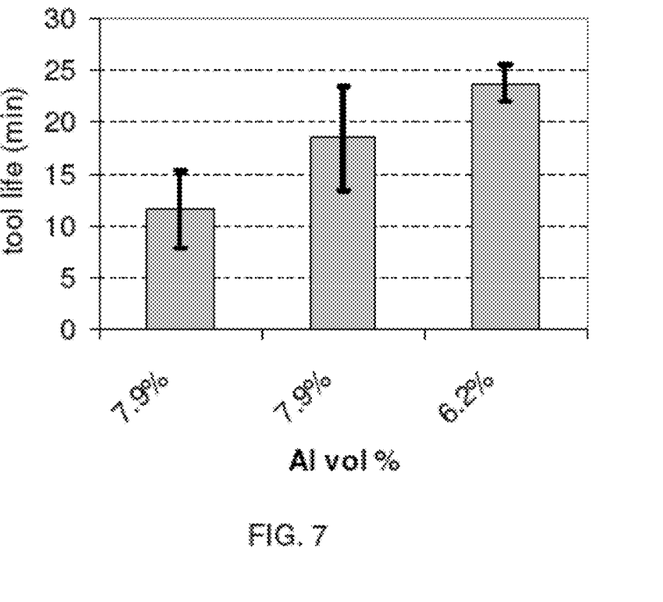
FIG. 7 is a plot of tool life in minutes in a continuous turning test in 8620 steel for samples with 5.0 vol. % ZrN and Al levels as indicated. The leftmost 7.9 vol. % Al sample was planetary milled, while the rightmost 7.9 vol. % Al sample and 6.2 vol. % Al sample were ball milled.

The effect of Al content on tool performance can be seen in FIG. 7. The three samples plotted in that graph are 84-2, 85-4, and 85-2 (from left to right). The amount of ZrN in each sample is about 5.0 vol. %, and the milling methods were as given in Table 2. Clearly, the tool with less Al content gave better performance, with an about 100% increase in tool life over the lowest performing sample.

Al content at or greater than 8.0 vol. %, as in some samples in series 91-X, yielded material that, for the most part, could not be well sintered. Except Sample 91-2, all of the sintered solids in series 91-X were full of cracks and not used to form into tools. Sample 91-2 contained 7.9 vol. % Al whereas the other samples in this series contained 8.0 vol. % Al. Based on these results, it appears that 7.9 vol. % is the upper limit of Al content.

A set of experiments varying both the Al and ZrN content, while keeping cBN constant at 48 vol. %, was done by blending the composition in an attritor mill as described hereinabove in regard to paragraphs describing sample preparation for the "Experimental Procedures." These blends were then pre-sintered at about 850° C. under flowing $N_2$ gas for about 1 hour prior to loading into high pressure cells and HPHT sintering. The effects of varying Al and ZrN content, on tool life, can be seen in FIG. 8A and on impact resistance can be seen in FIG. 8B. The data, in both figures, has been normalized to the performance of 7025 standard grade.

Figure 8A:
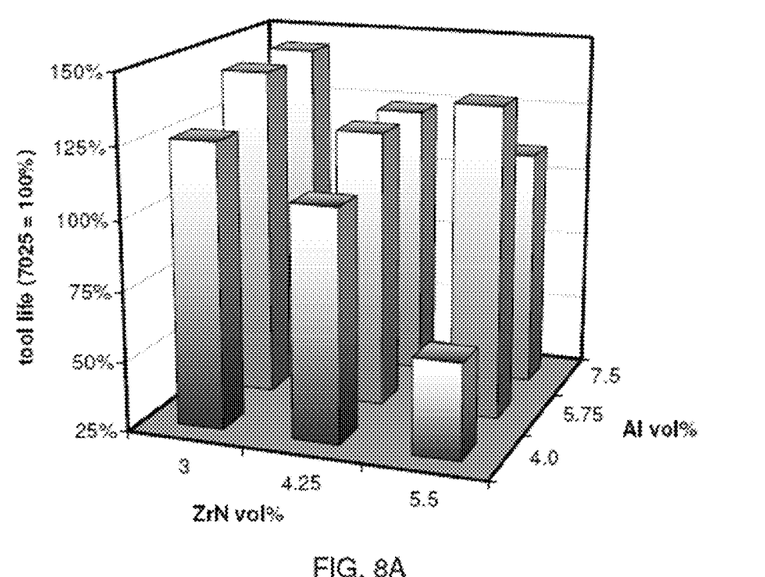
FIGS. 8A and 8B show results from a continuous turning test in 8620 steel (FIG. 8A) and an interrupted turning test in 52100 steel (FIG. 8B) for samples to be described below.

There are clearly discernible differences in the tool life. At 4.0 vol. % Al, the tool life decreases as ZrN content increases from 3.0 to 5.5 vol. %. The same trend is apparent at 7.5 vol. % Al. But at 5.75 vol. % Al, the performance decreases slightly at first upon increasing ZrN content, but then increases at 5.5 vol. % ZrN.

Figure 8B:
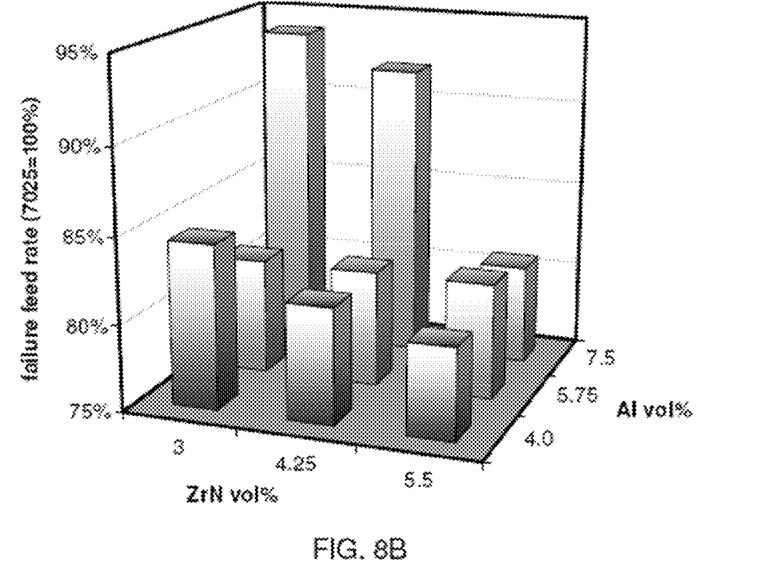

The toughness test results also show generally decreasing toughness with increasing ZrN content at all Al levels. In fact, the highest toughness is found for Al content at 7.5 vol. %. The optimal combination of toughness and tool life is obtained at 7.5 vol. % Al and 3.0 vol. % ZrN. This level of ZrN is similar to what has been found optimal in FIG. 2 for consistently high tool life.

In an embodiment the Al level in the composition is maintained at about 8 vol. % or less, alternatively, about 7 vol. %, alternatively between about 4 vol. % and about 8 vol. %.

Effect of cBN Content:

Test series 107-X systematically varied the cBN content to gauge the effect on tool performance. All of the tool performance tests described up to now have been on materials containing less than 50 vol. % cBN.

Figure 9A:
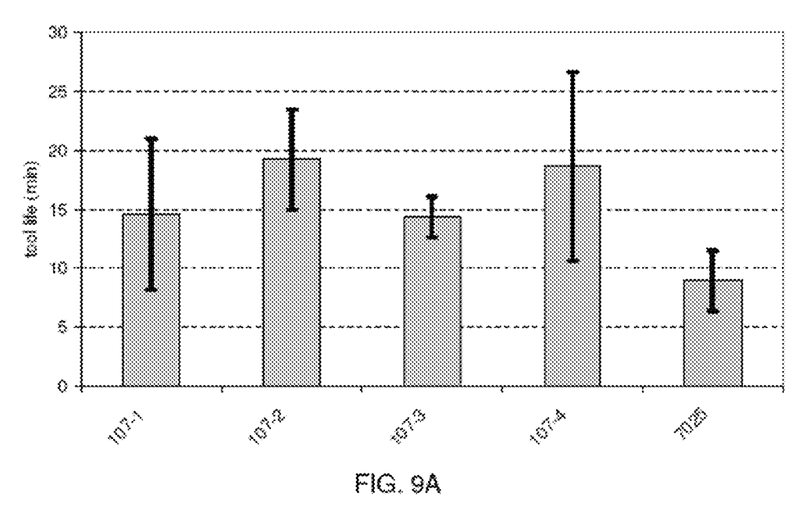
Figure 9B:
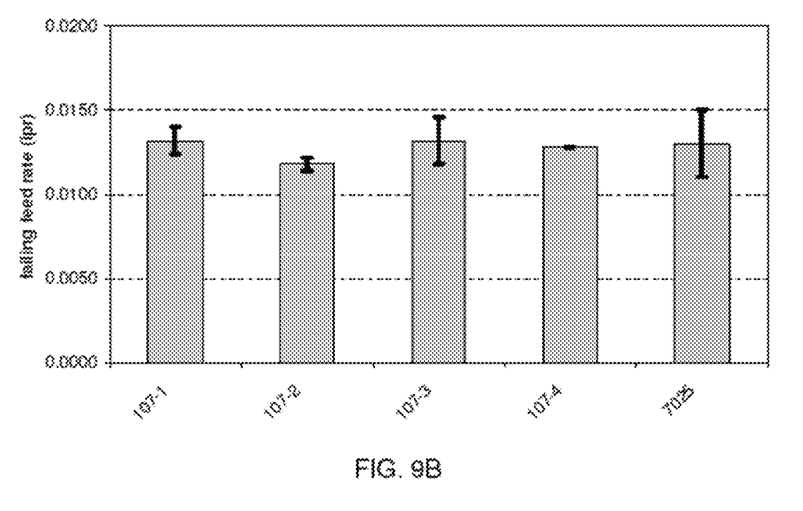

FIGS. 9A and 9B show results from a wear test (FIG. 9A) and a toughness test (FIG. 9B) of samples from series 107-X. As given in Table 1 and Table 2, the amount of cBN in each sample is increasing from left to right. As shown in FIG. 9B, the toughness did not increase with cBN content, but was similar to 7025 standard. Also, the wear performance seems to optimize at an intermediate level. Of course, this optimization may be further improved, as neither ZrN nor Al content has been optimized in these samples.

The dominant effect of ZrN content is confirmed by this set of experiments and is an important additive to the TiN matrix for cutting tools, for example, hard part turning tools. But a secondary effect relates to the Al content: too much Al, especially when ZrN content is increased, yields more brittle materials. The findings highlight the importance of controlling Al content, and its reaction with cBN. This can be done, for example, by reducing the initial amount of Al and/or pre-reacting the feed prior to HPHT sintering. A tertiary effect is that of the blending process: powder blending methods that increase homogeneity, such as planetary milling, provides some improvement in performance and feed blend homogeneity, but only if the compositional parameters have been optimized. However, it should be noted that planetary milling may not be the most suitable power blending method for mass production.

Although described in connection with preferred embodiments thereof, it will be appreciated by those skilled in the art that additions, deletions, modifications, and substitutions not specifically described may be made without departure from the spirit and scope of the invention as defined in the appended claims.

What is claimed is:

1. A cutting tool for high-speed hard part turning, comprising:
   a sintered compact including about 30 to about 80 vol. % cubic boron nitride and a binder phase,
   wherein prior to sintering, the binder phase includes TiN, about 7.5 vol. % Al, and about 3 to about 4.25 vol. % ZrN relative to the entire compact components, and
   wherein the binder phase has a higher vol. % of TiN than ZrN.

2. The cutting tool of claim 1, wherein the binder phase includes about 3 vol. % ZrN.

3. The cutting tool of claim 1, wherein the aluminum is present as an aluminum alloy that includes $NiAl_3$.

4. The cutting tool of claim 1, wherein the sintered compact includes about 50 vol. % cubic boron nitride relative to the whole sintered compact.

5. The cutting tool of claim 1, wherein the cubic boron nitride has a grain size of less than about 20 microns.

6. The cutting tool of claim 1, wherein the TiN and the ZrN are in a ratio from about 4.23 to about 12.58 by vol. %.

7. The cutting tool of claim 1, wherein the cubic boron nitride has a grain size having a bimodal distribution with about 75% of the cubic boron nitride having a grain size in a first range of about 2 microns to about 3 microns and about 25% of the cubic boron nitride has a grain size in a second range of about 1 micron to about 2 microns.

8. The cutting tool of claim 1, wherein the TiN and the ZrN are in a ratio greater than 4.23 by vol. %.

9. The cutting tool of claim 1, wherein high-speed hard part turning occurs at or above about 200 surface meters per minute.

10. A cutting tool for high-speed hard part turning, comprising:
    a sintered compact including about 30 to about 80 vol. % cubic boron nitride, about 7.5 vol. % aluminum or an aluminum alloy, and a binder phase,
    wherein the binder phase includes about 3 to about 4.5 vol. % ZrN relative to the entire compact components,
    wherein the binder phase includes TiN, and
    wherein the binder phase has a higher vol. % of TiN than ZrN.

11. The cutting tool of claim 10, wherein the sintered compact includes about 50 vol. % cubic boron nitride relative to the whole sintered compact.

12. The cutting tool of claim 10, wherein the cubic boron nitride has a grain size of less than about 20 microns, the grain size having a bimodal distribution with about 75% of the cubic boron nitride having a grain size in a first range of about 2 microns to about 3 microns and about 25% of the cubic boron nitride has a grain size in a second range of about 1 micron to about 2 microns.

13. A cutting tool, comprising:
    a sintered compact including about 50 vol. % cubic boron nitride and a binder phase, wherein the binder phase includes TiN, about 7.5 vol. % Al, and about 3 to about 4.25 vol. % ZrN, and
    wherein the binder phase has a higher vol. % of TiN than ZrN.

\* \* \* \* \*